(12) United States Patent
Kim et al.

(10) Patent No.: US 9,718,107 B2
(45) Date of Patent: Aug. 1, 2017

(54) BELT REPLACEMENT DEVICE

(71) Applicant: Hyundai Steel Company, Incheon (KR)

(72) Inventors: Sung K. Kim, Chungcheongnam-do (KR); Jong G. Do, Gyeongsangbuk-do (KR); Sang B. Lee, Gyeonggi-do (KR); Suck Y. Lee, Incheon (KR)

(73) Assignee: Hyundai Steel Company, Dong-gu (KR)

( * ) Notice: Subject to any disclaimer, the term of this patent is extended or adjusted under 35 U.S.C. 154(b) by 40 days.

(21) Appl. No.: 14/894,012

(22) PCT Filed: Dec. 27, 2013

(86) PCT No.: PCT/KR2013/012336
§ 371 (c)(1),
(2) Date: Nov. 25, 2015

(87) PCT Pub. No.: WO2014/193064
PCT Pub. Date: Dec. 4, 2014

(65) Prior Publication Data
US 2016/0114369 A1 Apr. 28, 2016

(30) Foreign Application Priority Data

May 30, 2013 (KR) .................. 10-2013-0062140

(51) Int. Cl.
*B65G 21/06* (2006.01)
*B65H 16/06* (2006.01)
(Continued)

(52) U.S. Cl.
CPC .......... *B21C 47/18* (2013.01); *B21C 47/3433* (2013.01); *B65H 16/06* (2013.01);
(Continued)

(58) Field of Classification Search
CPC ..... B21C 47/18; B21C 47/3433; B65H 16/06; B65H 16/106
(Continued)

(56) References Cited

U.S. PATENT DOCUMENTS 4,065,067 A * 12/1977 Martinez ................ B65H 19/14
242/421.6
4,215,932 A * 8/1980 Castelli ................ G03G 15/754
156/159

(Continued)

FOREIGN PATENT DOCUMENTS

CN 102502326 A 6/2012
EP 0699601 A1 3/1996
(Continued)

OTHER PUBLICATIONS

Office Action issued in corresponding Chinese Patent Application No. 201380077076.8, dated Jul. 21, 2016, by the State Intellectual Property Office of P.R. China.
(Continued)

*Primary Examiner* — Douglas Hess
(74) *Attorney, Agent, or Firm* — Locke Lord LLP; Howard M. Gitten (57) ABSTRACT

A belt replacement device may include: a base portion having a belt placed thereon, the belt being wound in a roll shape; a rotating portion mounted on the base portion, and rotating the belt wound in a roll shape; a transporting portion holding and transporting the belt passed through the rotating portion; a guide portion guiding the belt discharged through the transporting portion; and a loading portion to which the belt dropped from the guide portion is loaded, and the belt replacement device can improve winding workability for the belt.

12 Claims, 9 Drawing Sheets

(51) Int. Cl.
 *B65H 20/02* (2006.01)
 *B21C 47/18* (2006.01)
 *B21C 47/34* (2006.01)
 *B65H 16/10* (2006.01)
 *B65G 15/00* (2006.01)

(52) U.S. Cl.
 CPC .......... *B65H 16/106* (2013.01); *B65G 15/00* (2013.01); *B65H 2301/41306* (2013.01); *B65H 2301/41342* (2013.01); *B65H 2301/41518* (2013.01); *B65H 2301/413526* (2013.01); *B65H 2301/4216* (2013.01); *B65H 2301/42192* (2013.01); *B65H 2701/173* (2013.01)

(58) Field of Classification Search
 USPC .............. 242/550, 555.3, 563.1, 432.6; 198/810.01, 810.03, 810.04, 812; 399/121, 162, 313; 226/117
 See application file for complete search history.

(56) References Cited

U.S. PATENT DOCUMENTS

| | | | | |
|---|---|---|---|---|
| 4,363,695 A * | 12/1982 | Marass | ............. | B65H 19/1836 156/504 |
| 5,190,234 A * | 3/1993 | Ezekiel | ................. | B65H 19/14 156/157 |
| 5,273,605 A * | 12/1993 | Mitchell | ................... | B31C 1/00 156/183 |
| 5,308,007 A * | 5/1994 | Stroszynski | ....... | B65H 19/1836 15/306.1 |
| 5,659,850 A * | 8/1997 | Reeder | ................ | G03G 15/758 226/96 |
| 5,782,179 A * | 7/1998 | Kagawa | .................. | B41C 1/144 101/128.4 |
| 6,340,130 B2 * | 1/2002 | Wild | .................... | B65H 23/042 156/324 |
| 6,523,775 B2 * | 2/2003 | Fan | ........................ | B65G 23/00 198/804 |
| 6,536,183 B1 * | 3/2003 | Brown | ................... | B65G 51/03 53/250 |
| 6,676,062 B1 * | 1/2004 | Herhaus | ................. | B65H 19/14 156/504 |
| 7,111,438 B2 * | 9/2006 | Arima | ................... | B65B 11/045 242/552 |
| 7,273,142 B2 * | 9/2007 | Huis | .................... | B31D 5/0073 198/369.2 |
| 7,546,971 B2 * | 6/2009 | Pappas | ................ | B65H 19/123 242/533.7 |
| 7,618,004 B2 * | 11/2009 | Gelli | .................. | B65H 19/1836 242/555 |
| 8,032,054 B2 * | 10/2011 | Hollar | ............... | G03G 15/1615 399/107 |
| 8,245,832 B2 * | 8/2012 | Fickeisen | ............... | B65G 15/00 198/313 |

FOREIGN PATENT DOCUMENTS

| | | |
|---|---|---|
| JP | 62-222973 A | 9/1987 |
| JP | 2002114352 A | 4/2002 |
| JP | 2006056663 A | 3/2006 |
| KR | 20100034881 A | 4/2010 |
| KR | 20110033731 A | 3/2011 |
| KR | 20130013620 A | 2/2013 |

OTHER PUBLICATIONS

PCT International Search Report dated Mar. 4, 2014, issued during the prosecution of corresponding PCT International Patent Application No. PCT/KR2013/012336.

State Intellectual Property Office of P.R. China, Office Action issued in corresponding Chinese Patent Application No. 201380077076.8, dated Jan. 17, 2017.

* cited by examiner

BELT REPLACEMENT DEVICE

CROSS-REFERENCE TO RELATED APPLICATIONS

This application is the national phase under 35 U.S.C. §371 of PCT International Application No. PCT/KR2013/012336, filed Dec. 27, 2013, which claims benefit and priority of Korean Application No. 10-2013-0062140, filed May 20, 2013 the entire contents of the aforementioned applications are hereby incorporated herein by reference.

TECHNICAL FIELD

The present invention relates to a belt replacement device, and more particularly, to a belt replacement device which is capable of improving workability while rapidly installing a belt.

BACKGROUND ART

In general, a repair operation for a belt conveyer in a steel mill includes an installation operation as a pre-operation for loading a belt onto the equipment when the belt is replaced and repaired.

The installation operation is to cut out a folded belt by a replacement length, while vertically moving the belt using a crane.

The related art of the present invention is disclosed in Korean Patent Laid-open Publication No. 2010-0034881 published on Apr. 2, 2010 and entitled "Belt replacement device of belt conveyer".

DISCLOSURE

Technical Problem

Various embodiments of the present invention are directed to a belt replacement device capable of improving workability while rapidly installing a belt.

Technical Solution

In an embodiment, a belt replacement device may include: a base portion for receiving a belt placed thereon, the belt being wound in a roll shape; a rotating portion mounted on the base portion, and rotating the belt wound in a roll shape; a transporting portion holding and transporting the belt passed through the rotating portion; a guide portion guiding the belt discharged through the transporting portion; and a loading portion to which the belt dropped from the guide portion is loaded.

The base portion may include: a fixed frame portion installed on a fixed body; and a support frame portion coupled to the fixed frame, and supporting a roll bar passing through the center of the belt wound in a roll shape.

The support frame portion may include: a support coupled to the fixed frame portion; and a stand mounted on the support so as to place the roll bar thereon, and adjusting the distance between the roll bar and the rotating portion such that the outer circumference of the belt wound in a roll shape comes in contact with the rotating portion.

The stand may be mounted on the support so as to be lifted and lowered, and adjust the level of the roll bar.

The rotating portion may include: a first rotating roller portion rotatably mounted on the base portion and coming in contact with the belt wound in a roll shape; a second rotating roller portion rotatably mounted on the base portion, coming in contact with the belt wound in a roll shape, and separated from the first rotating roller portion; and a rotation power unit connected to the first rotating roller portion and providing a rotational force to the first rotating roller portion.

The rotating portion may further include a rotation transmission portion connected to the first and second rotating roller portions, and transmitting the rotational force of the first rotating roller portion to the second rotating roller portion.

The transporting portion may include: a lower transporting roller rotatably mounted on the base portion; a reduction adjusting portion mounted on the base portion and moved in the vertical direction; an upper transporting roller rotatably mounted on the reduction adjusting portion, and arranged above the lower transporting roller, wherein the reduction adjusting portion is vertically moved to adjust the distance between the lower transporting roller and the upper transporting roller; and a transport power unit connected to the lower transporting roller and providing a rotational force to the lower transporting roller.

The guide portion may include: a guide frame arranged at the rear of the transporting portion; a guide roller rotatably mounted on the guide frame, and coming in contact with the belt discharged from the transporting portion; and a guide support supporting the guide frame.

The guide support may have a length that is varied to adjust the level of the guide frame.

The loading portion may include: a loading frame portion forming a space in which the belt dropped from the guide portion is loaded; and a loading guide portion moved along the loading frame, and adjusting a drop zone of the belt so as to induce the belt to be folded and loaded.

The level of the loading guide portion may be adjusted to correspond to the loading height of the belt.

The loading guide portion may include a pair of guide rollers between which the belt is passed, and the pair of guide rollers may adjust the drop zone of the belt while moved along the loading frame.

Advantageous Effects

According to the embodiment of the invention, since the belt replacement device folds and loads the belt without a crane, the winding workability of the belt wound in a roll shape can be improved.

The support frame portion supports the roll bar passing through the center of the belt wound in a roll shape, and has a height that is varied to continuously come in contact with the belt wound in a roll shape.

The rotating portion supports the belt wound in a roll shape, and the belt wound in a roll shape is rotated through the rotation of the rotating portion. Thus, the winding speed of the belt can be improved.

The transporting portion pulls the belt to be transport to the guide portion in a state where the transporting portion is close to the belt, thereby inducing the belt to be unwound.

As the level of the guide portion is adjusted, the drop level of the belt dropped onto the loading portion can be adjusted.

The loading portion can house the folded belt and prevent the collision of the folded belt.

The loading guide portion can be automatically reciprocated to adjust the drop zone of the belt such that the belt is folded and loaded.

BEST MODE

Embodiments of the invention will hereinafter be described in detail with reference to the accompanying drawings. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Figure 1:
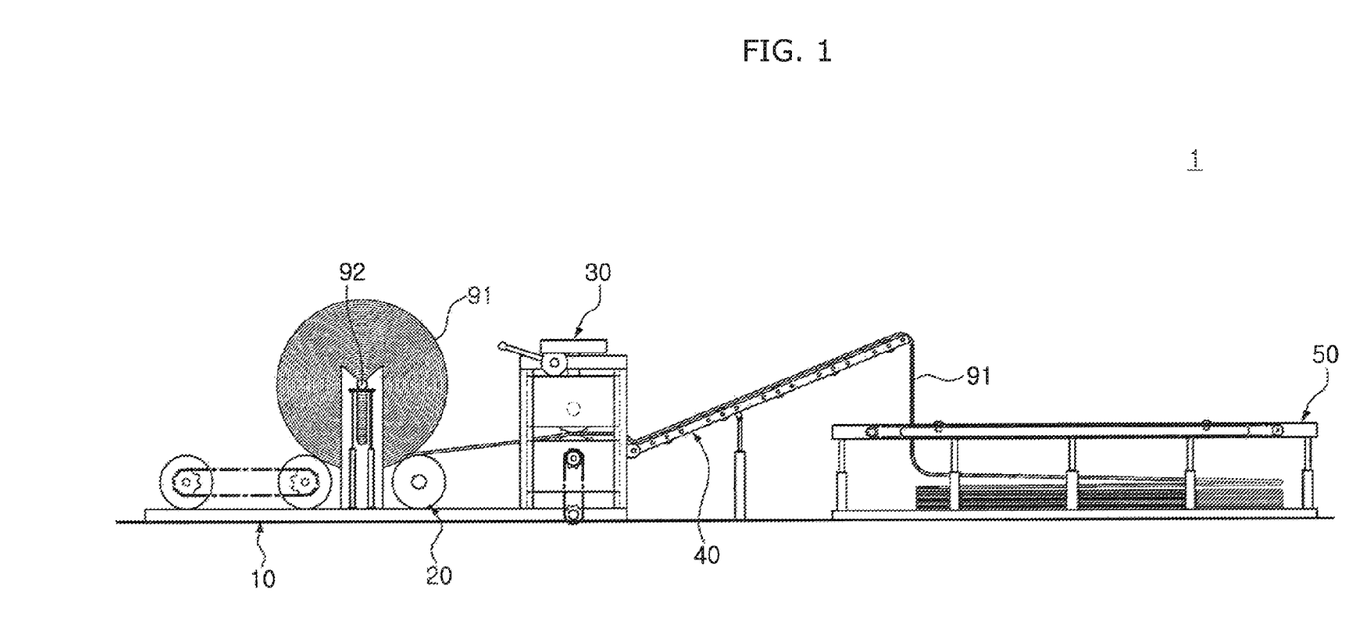
FIG. 1 is a schematic side view of a belt replacement device in accordance with an embodiment of the present invention.
Figure 2:
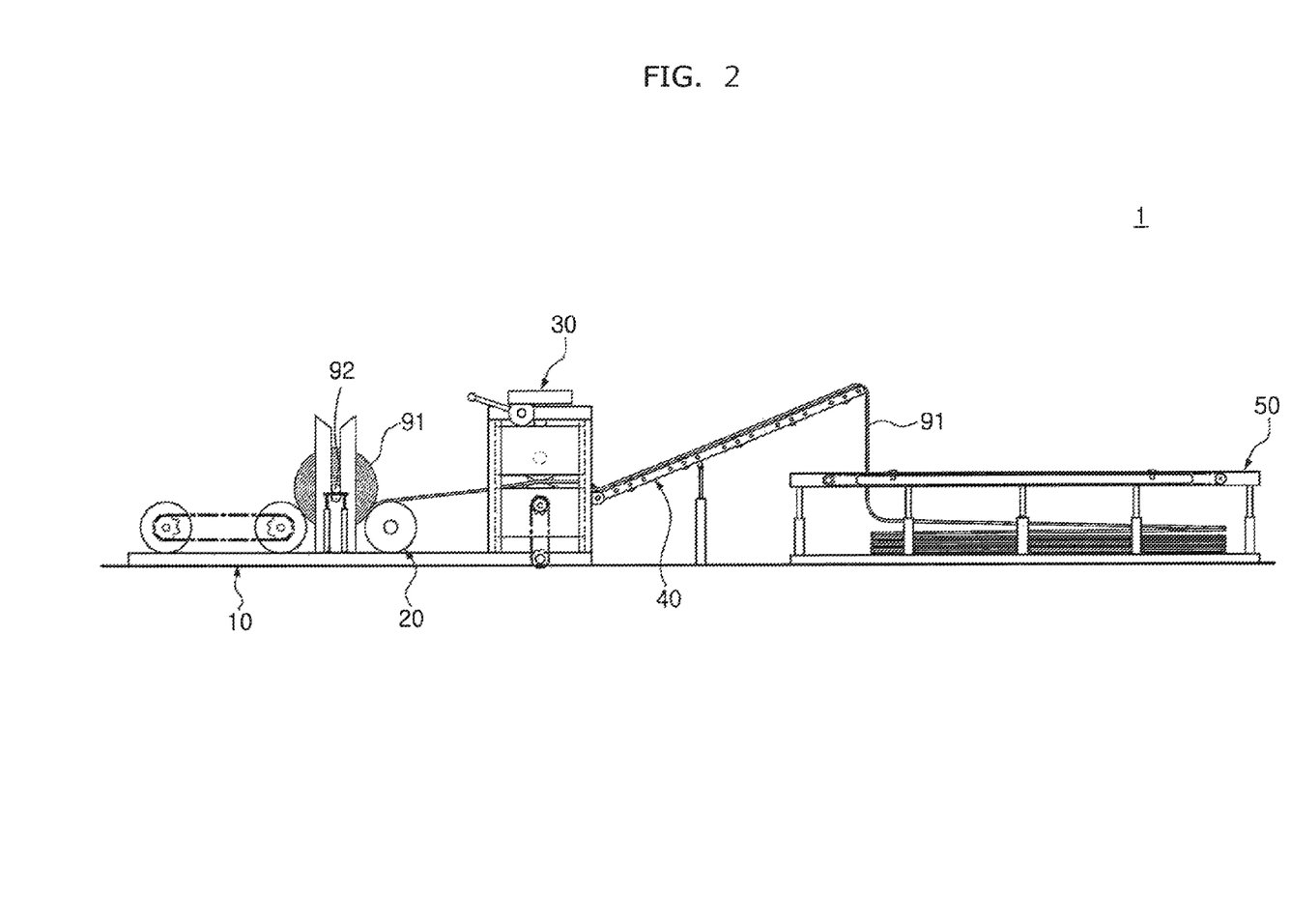
FIG. 2 schematically illustrates a state in which a belt of FIG. 1 is unwound and the outer diameter of a roll shape formed by the belt is reduced.

FIG. 1 is a schematic side view of a belt replacement device in accordance with an embodiment of the present invention. FIG. 2 schematically illustrates a state in which a belt of FIG. 1 is unwound and the outer diameter of a roll shape formed by the belt is reduced. Referring to FIGS. 1 and 2, the belt replacement device 1 in accordance with the embodiment of the present invention includes a base portion 10, a rotating portion 20, a transporting portion 30, a guide portion 40, and a loading portion 50.

The base portion 10 is fixed to a fixed body such as the ground surface, and a belt 91 wound in a roll shape is placed on the base portion 10. The belt 91 wound in a roll shape has an opening formed in the central part thereof, and a roll bar 92 placed on the base portion 10 is inserted into the central part of the belt 91 wound in a roll shape and protrudes in the axial direction.

The rotating portion 20 is mounted on the base portion 10 and rotates the belt 91 wound in a roll shape. That is, the rotating portion 20 comes in contact with the belt 91 wound in a roll shape, and rotates the belt 91 wound in a roll shape while being rotated.

The transporting portion 30 holds the belt 91 and transports the belt 91 through rotation thereof. Then, the belt 91 is unwound. The transporting portion 30 is mounted on the base portion 10. The transporting portion 30 may be arranged close to the base portion 10.

The guide portion 40 guides the belt 91 unwound through the transporting portion 30. The guide portion 40 is mounted on the base portion 10, and has an end arranged above the loading portion 50. The other end of the guide portion 40 may be arranged close to the transporting portion 30.

The loading portion 50 is positioned under the guide portion 40, and the belt 91 dropping from the guide portion 40 is loaded on the loading portion 50.

Figure 3:
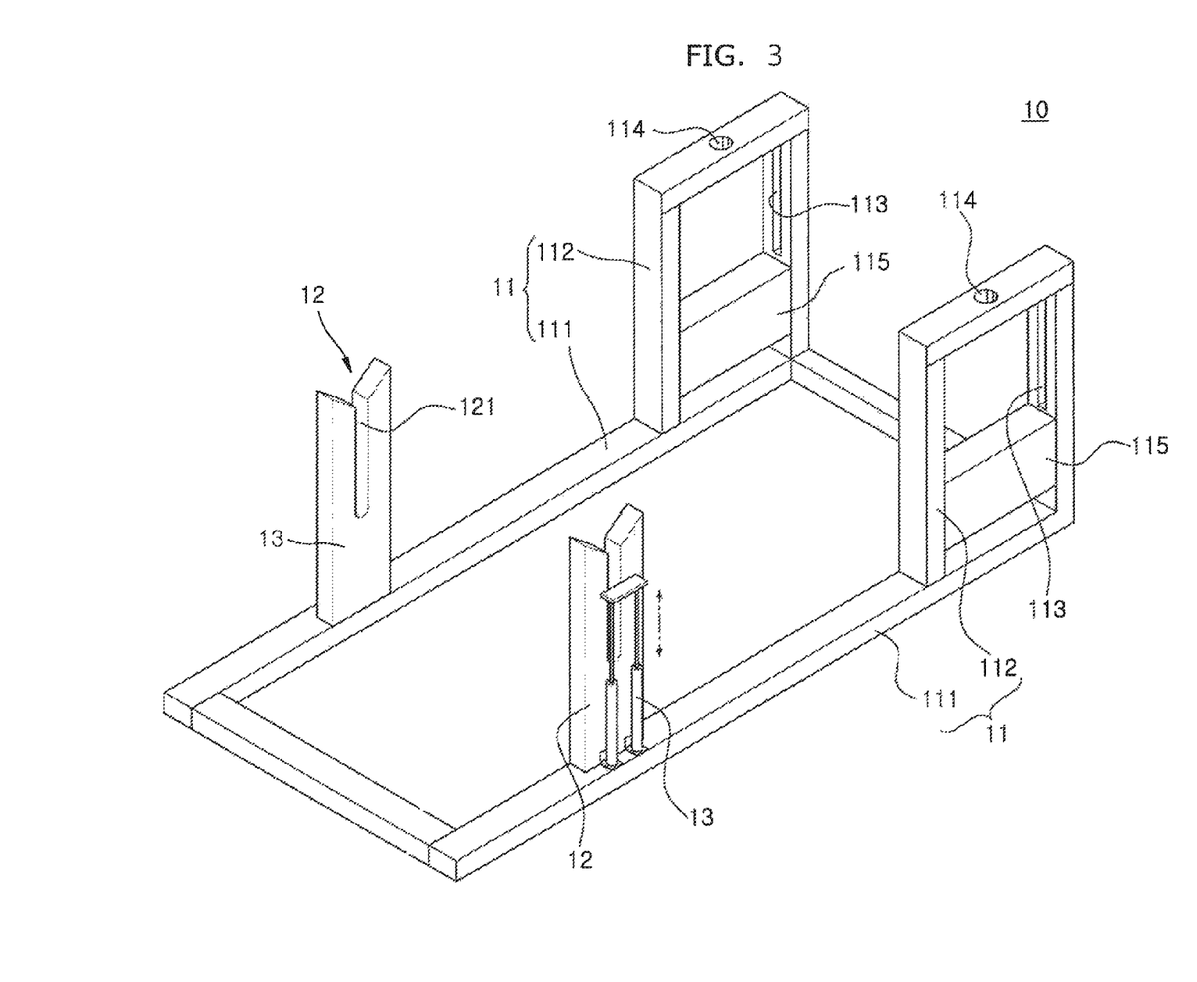
FIG. 3 schematically illustrates the base portion in the belt replacement device in accordance with the embodiment of the present invention.

FIG. 3 schematically illustrates the base portion in the belt replacement device in accordance with the embodiment of the present invention. Referring to FIGS. 1 to 3, the base portion 10 in accordance with the embodiment of the present invention includes a fixed frame portion 11 and a support frame portion 12.

The fixed frame portion 11 is fixed to a fixed body. In the present embodiment, the fixed frame portion 11 includes a base frame 111 and a first and second vertical frame 112. The base frame 111 is placed on the fixed body such as the ground surface, and has a rectangular belt shape. The first and second vertical frame 112 are each coupled across from each other to the top of the base frame 111 and protrudes upward. Each vertical frame 112 has a rectangular belt shape, and guide grooves 113 are formed in a pair of frames facing each other in the longitudinal direction. Furthermore, a frame forming the upper part of each vertical frame 112 has a through-hole 114 formed therein. The fixed frame portion 11 includes a lower support 115. A respective lower support 115 is fixed and installed inside the bottom of each vertical frame 112. In the present embodiment, the vertical frame 112 and the lower support 115 are integrated with each other.

A first and second support frame portion 12 are each coupled to the fixed frame portion 11, and supports the roll bar 92 passed through the central portion of the belt 91 wound in a roll shape. Each support frame portion 12 in accordance with the embodiment of the present invention includes a support 13 and a stand 14.

The support 13 is coupled to the base frame 111 and protrudes upward, and the roll bar 92 is inserted into a guide hole 121 formed in the central part of the support 13. The guide hole 121 guides the roll bar 92 in the vertical direction. A stand 14 is mounted on each support 13 so as to place the roll bar 92 thereon.

The stand 14 adjusts the distance between the roll bar 92 and the rotating portion 20 such that the outer circumferential part of the belt 91 wound in a roll shape comes in contact with the rotating portion 20. That is, the stand 14 is mounted on the support 13, and adjusts the level of the roll bar 92 while being lifted or lowered. Thus, as the belt 91 is unwound, the height of the stand 14 is dropped, and the level of the roll bar 92 supported by the stand 14 is also dropped in connection with the stand 14.

Figure 4:
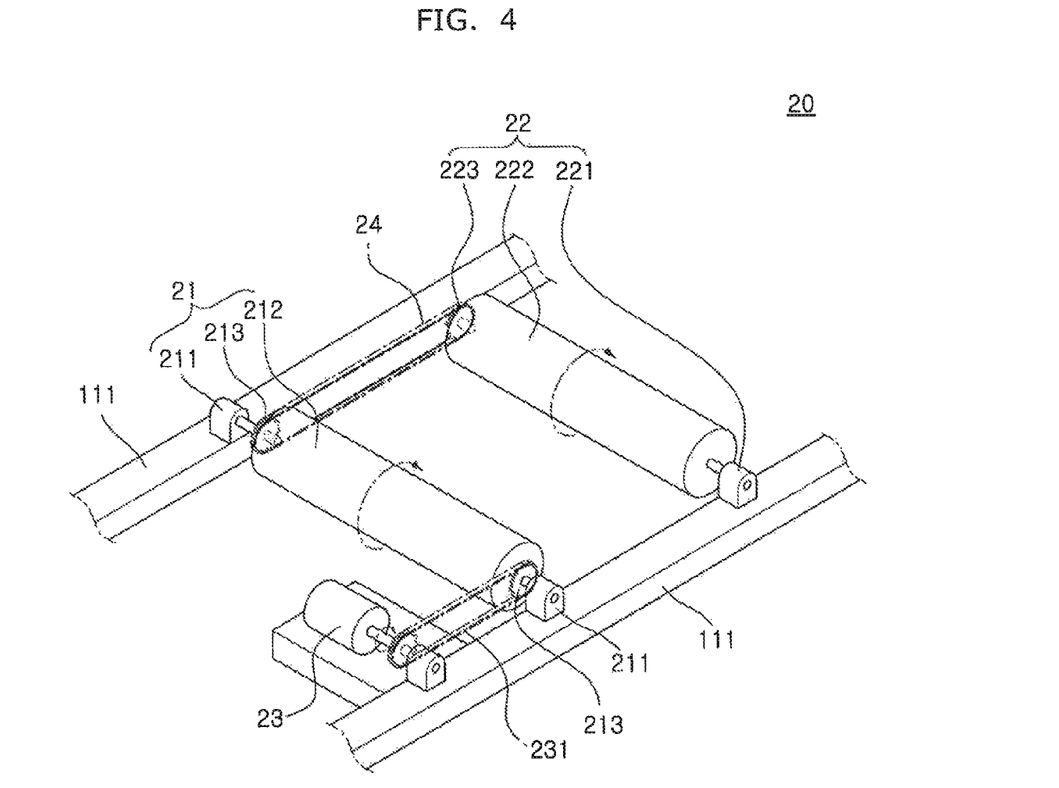
FIG. 4 is a diagram schematically illustrating the rotating portion in the belt replacement device in accordance with the embodiment of the present invention.

FIG. 4 is a diagram schematically illustrating the rotating portion in the belt replacement device in accordance with the embodiment of the present invention. Referring to FIGS. 1 to 4, the rotating portion 20 in accordance with the embodiment of the present invention includes a first rotating roller portion 21, a second rotating roller portion 22, and a rotation power unit 23.

The first rotating roller portion 21 and the second rotating roller portion 22 are rotated while coming in contact with the belt 91 wound in a roll shape, and the rotation power unit 23 is connected to any one of the first and second rotating roller portions 21 and 22 and rotates the connected rotating roller. When the belt 91 wound in a roll shape is rotated through the rotation of any one of the first and second rotating roller portions 21 and 22, the other one which supports the belt 91 wound in a roll shape is rotated.

The rotating portion 20 may further include a rotation transmission portion 24. The rotation transmission portion 24 connects the first and second rotating roller portions 21 and 22 so as to transmit a rotational force.

The first rotating roller portion 21 is rotatably mounted on the base portion 10, and comes in contact with the belt 91 wound in a roll shape. In the present embodiment, the first rotating roller portion 21 includes a pair of first rotation supports 211, a first rotating roller 212, and a first rotating sprocket 213. The pair of first rotation supports 211 are mounted on the base frame 111 so as to face each other, and both ends of the first rotating roller 212 are rotatably mounted on the first rotation supports 211. The first rotating roller 212 is positioned under the belt 91 wound in a roll shape, and comes in contact with the belt 91 wound in a roll shape. The first rotating sprocket 213 is formed at both ends of the first rotating roller 212.

The second rotating roller portion 22 is rotatably mounted on the base portion 10, and comes in contact with the belt 91 wound in a roll shape. The second rotating roller portion 22 is separated from the first rotating roller portion 21. In the present embodiment, the second rotating roller portion 22 includes a pair of second rotation supports 221, a second rotating roller 222, and a second rotating sprocket 223. The pair of second rotation supports 221 are mounted on the base frame 111 so as to face each other, and both ends of the second rotating roller 222 are rotatably mounted on the second rotation supports 221. The second rotating roller 222 is positioned under the belt 91 wound in a roll shape, and comes in contact with the belt 91 wound in a roll shape. The second rotating sprocket 223 is formed at the other end of the second rotating roller 222.

The rotation power unit 23 is mounted on the base portion 10, and connected to the first rotating roller portion 21 so as to provide a rotational force. In the present embodiment, a motor coupled to the base frame 111 is used as the rotation power unit 23, and a driving chain 231 is wound on the motor and the first rotating sprocket 213 formed at an end of the first rotating roller 212. Thus, when the motor is rotated, the driving chain 231 is moved along an endless track so as to rotate the first rotating roller 212 connected to the first rotating sprocket 213.

The rotation transmission portion 24 connects the first and second rotating roller portions 21 and 22, and transmits the rotational force of the first rotating roller portion 21 to the second rotating roller portion 22. In the present embodiment, the rotation transmission portion 24 has a chain shape in which it is wound on the first rotating sprocket 213 formed at the other end of the first rotating roller 212 and the second rotating sprocket 223 formed at the other end of the second rotating roller 222.

When the first rotating roller 212 is rotated by the rotation power unit 23, the second rotating roller 222 is rotated in the same direction as the first rotating roller 212 by the rotation transmission portion 24. Then, the belt 91 wound in a roll shape and coming in contact with the first and second rotating rollers 212 and 222 is unwound while rotated in the opposite direction to the first rotating roller 212.

Thus, although one power source or the rotation power unit 23 is used, the first and second rotating roller portions 21 and 22 can be driven at the same time through the rotation transmission portion 24. Therefore, since the first and second rotating roller portions 21 and 22 are rotated at the same speed, the belt 91 wound in a roll shape can be stably rotated.

Figure 5:
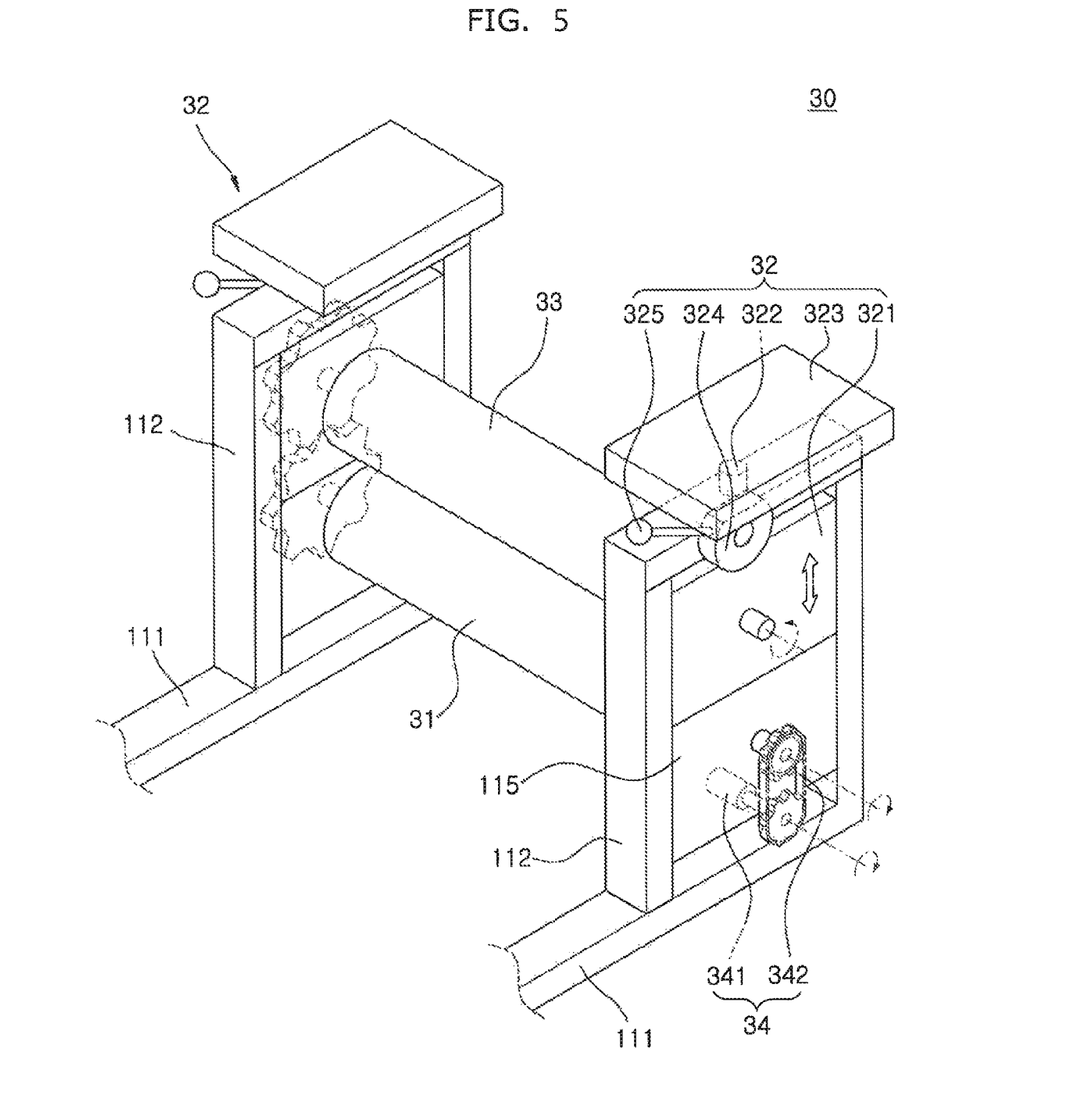
FIG. 5 schematically illustrates the transporting portion in the belt replacement device in accordance with the embodiment of the present invention.

FIG. 5 schematically illustrates the transporting portion in the belt replacement device in accordance with the embodiment of the present invention. Referring to FIGS. 1, 3, and 5, the transporting portion 30 in accordance with the embodiment of the present invention includes a lower transporting roller 31, a reduction adjusting portion 32, an upper transporting roller 33, and a transport power unit 34.

The lower transporting roller 31 is rotatably mounted on the base portion 10. In the present embodiment, the lower transporting roller 31 is rotatably mounted between the respective lower support 115 fixed inside the bottom of each vertical frame 112 (refer to FIG. 3).

The reduction adjusting portion 32 is mounted on each vertical frame 112 of the base portion 10 so as to be vertically moved. In the present embodiment, each reduction adjusting portion 32 includes a reduction support 321, a reduction through rod 322, a reduction fixing portion 323, a reduction rotating portion 324, and a reduction handle 325.

The reduction support 321 is vertically moved along the inner surface of the vertical frame 112. For this operation, protrusions formed at both ends of the reduction support 321 are inserted into the guide grooves 113 of the vertical frame 112. The reduction through rod 322 is coupled to the top of the reduction support 321, and passed through the through-hole 114 formed at the top of the vertical frame 112. The reduction fixing portion 323 is coupled to the top of the reduction through rod 322 passing through the vertical frame 112, and arranged above the vertical frame 112. The reduction rotating portion 324 is rotatably coupled to the top of the vertical frame 112, and supports the reduction fixing portion 323. The reduction rotating portion 324 has a cam shape formed by cutting out a part of a disk shape, and thus has a different diameter depending on positions. The reduction handle 325 is connected to the reduction rotating portion 324, and provides a rotational force to the reduction rotating portion 324. Thus, when the reduction handle 325 is rotated, the level of the reduction fixing portion 323 supporting the reduction rotating portion 324 is adjusted due to the diameter difference of the reduction rotating portion 324. As the level of the reduction fixing portion 323 is changed, the reduction support 321 which maintains the connection with the reduction fixing portion 323 is vertically moved in the vertical frame 112.

The upper transporting roller 33 is rotatably mounted on the reduction adjusting portion 32, and arranged above the lower transporting roller 31. The reduction adjusting portion 32 is vertically moved to adjust the distance between the upper transporting roller 33 and the lower transporting roller 31.

The transport power unit 34 is mounted on the base portion 10, and connected to the lower transporting roller 31 so as to provide a rotational force. In the present embodiment, the transport power unit 34 includes a motor 341 and a motor chain 342. The motor 341 is fixed to the bottom of the vertical frame 112, and the motor chain 342 is wound on the motor 341 and an end of the lower transporting roller 31, and moved along an endless track.

Thus, an operator inserts the belt 91 between the lower transporting roller 31 and the upper transporting roller 33, and controls the reduction adjusting portion 32 to move the upper transporting roller 33 downward. When the upper transporting roller 33 is moved downward, the lower transporting roller 31 and the upper transporting roller 33 come in contact with the belt 91. In this state, when the motor 341 of the transport power unit 34 is driven, the lower transporting roller 31 is rotated by the motor chain 342. At this time, the upper transporting roller 33 is rubbed against the belt 91 or engaged with the lower transporting roller 31, and rotated in the opposite direction to the lower transporting roller 31. The belt 91 caught between the lower transporting roller 31 and the upper transporting roller 33 is discharged towards support frame portion 12.

Figure 6:
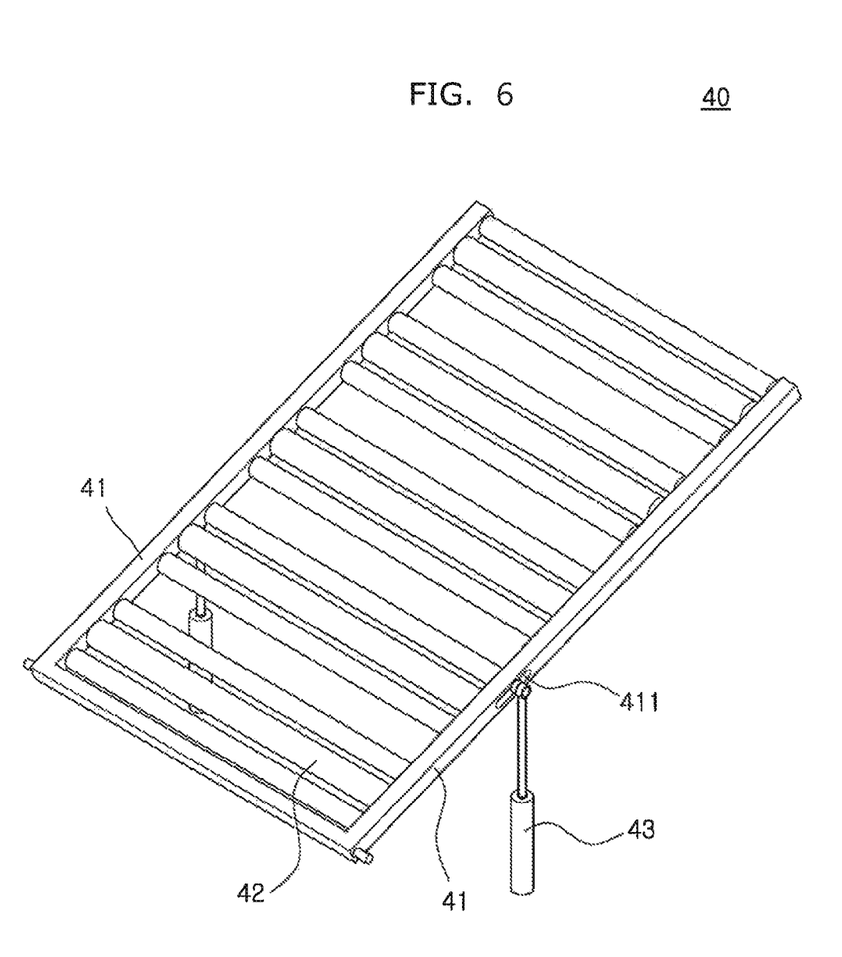
FIG. 6 is a top perspective view illustrating the guide portion in the belt replacement device in accordance with the embodiment of the present invention.

FIG. 6 schematically illustrates the guide portion in the belt replacement device in accordance with the embodiment of the present invention. Referring to FIGS. 1 and 6, the guide portion 40 includes a guide frame 41, a guide roller 42 comprising one or more rollers, and a guide support 43.

The guide frame 41 is arranged at the rear of the transporting portion 30. In the present embodiment, one end of the guide frame 41 is rotatably mounted on the base portion 10. The guide frame 41 includes a pair of frames arranged to face each other, and has one end hinge-coupled to the vertical frame 112.

The guide roller 42 is mounted on the guide frame 41, and rotated while coming in contact with the belt 91 discharged from the transporting portion 30. In the present embodiment, the guide roller 42 is arranged between the pair of guide frames 41, and both ends of the guide roller 42 are rotatably mounted on the respective guide frames 41.

The guide support 43 supports the guide frame 41. The guide support 43 has a height that is varied to adjust the level of the guide frame 41. In the present embodiment, the guide support 43 includes a hydraulic cylinder of which the length is adjusted by hydraulic pressure. The bottom surface of the guide support 43 is fixed to a fixed body such as the ground surface, and the upper end portion of the guide support 43 is rotatably mounted on the guide frame 41. At this time, the guide frame 41 has a rectangular groove 411 formed therein, and the upper end part of the guide support 43 can be moved along the rectangular groove 411. Thus, the angle of the guide frame 41 is adjusted through the height difference of the guide support 43.

Figure 7:
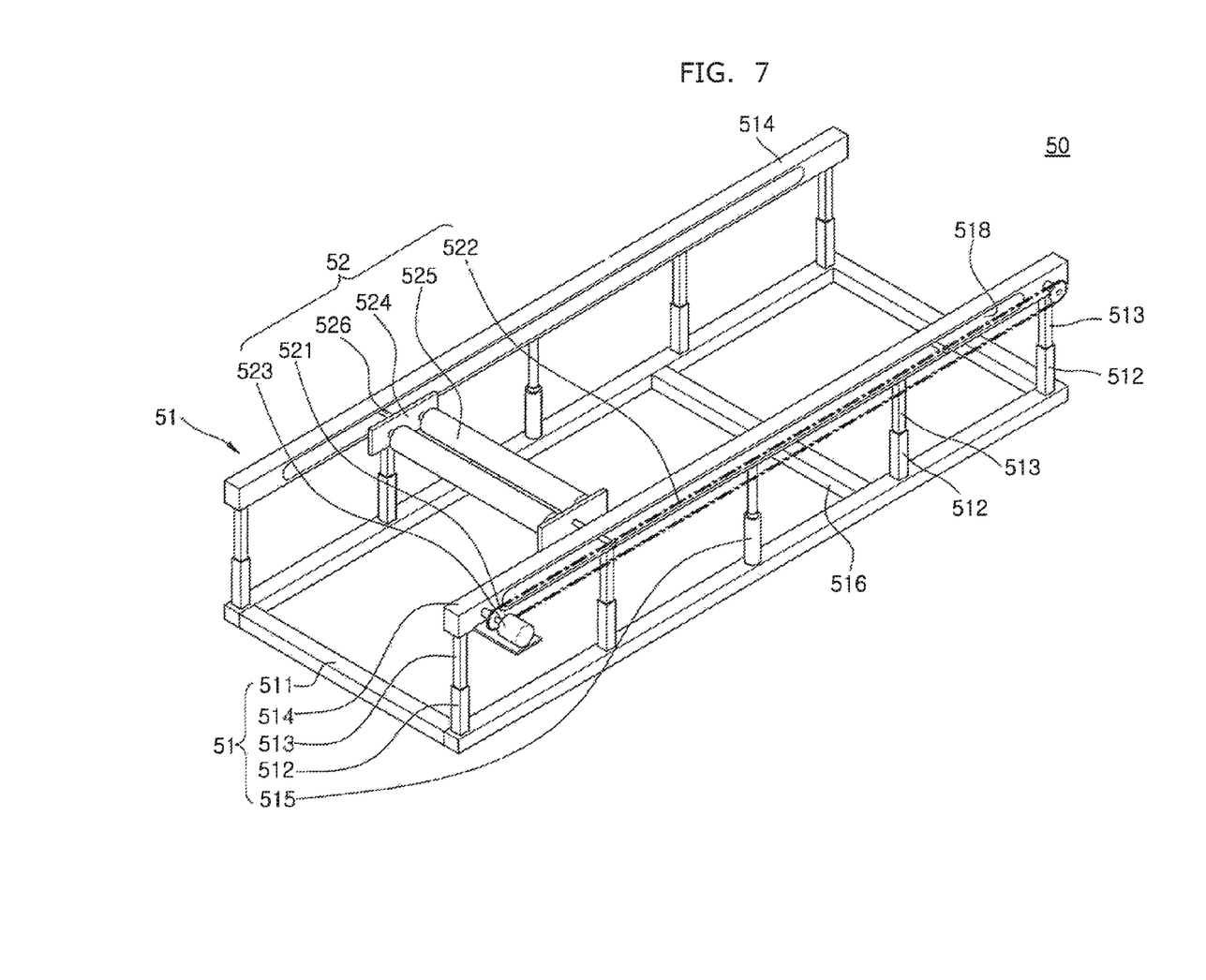
FIG. 7 is a perspective view of the loading portion in the belt replacement device in accordance with the embodiment of the present invention.
Figure 8A:
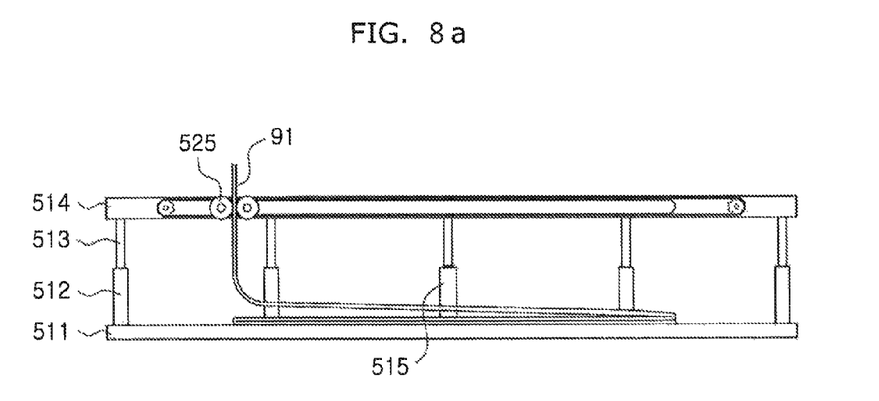
FIGS. 8a-8d schematically illustrates the state in which the belt is loaded in the loading portion in the belt replacement device in accordance with the embodiment of the present invention.
Figure 8B:
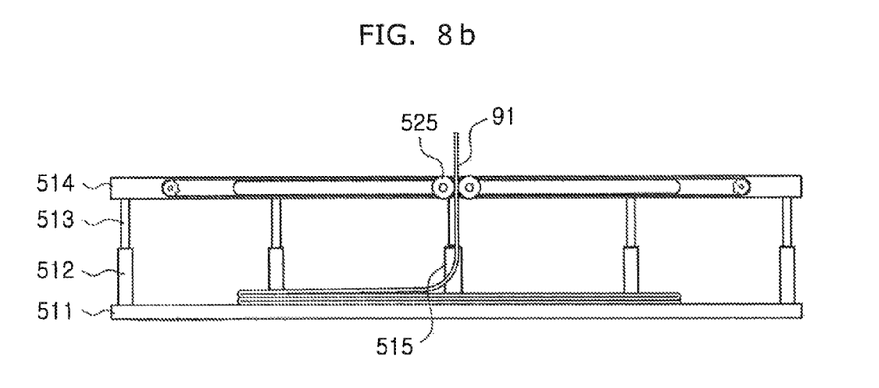
Figure 8C:
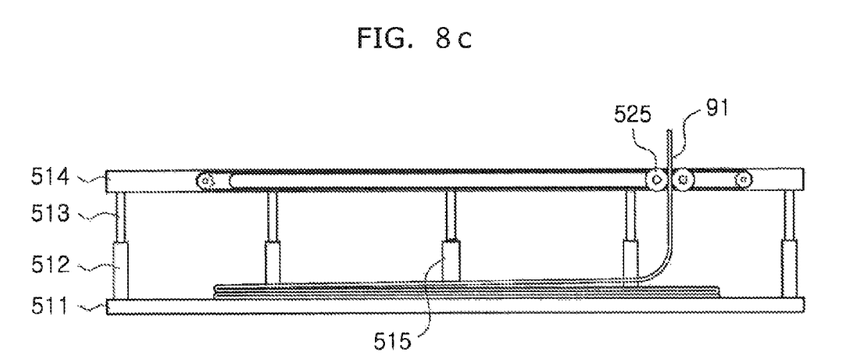
Figure 8D:
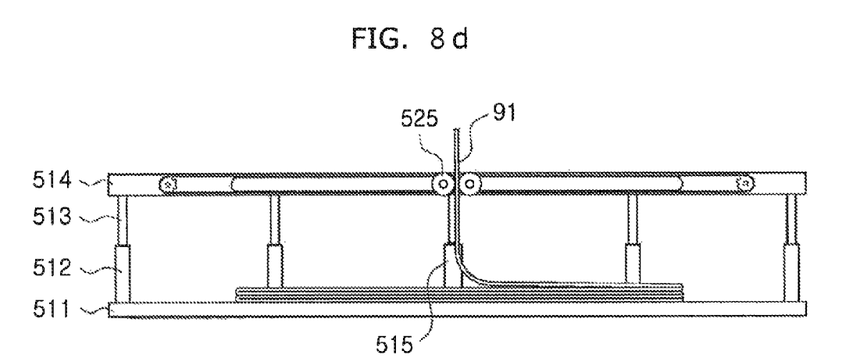

FIG. 7 schematically illustrates the loading portion in the belt replacement device in accordance with the embodiment of the present invention. FIG. 8 schematically illustrates the state in which the belt is loaded in the loading portion in the belt replacement device in accordance with the embodiment of the present invention. Referring to FIGS. 1, 7, and 8, the loading portion 50 includes a loading frame portion 51 and a loading guide portion 52.

The level of the loading frame portion 51 is adjusted to correspond to the loading level of the belt 91. The loading frame portion 51 forms a space in which the belt 91 dropping from the guide portion 40 is loaded. In the present embodiment, the loading frame portion 51 includes a lower frame 511, a pillar frame 512, an insertion frame 513, an upper frame 514, and a frame adjusting body 515.

The lower frame 511 is placed on a fixed body such as the ground surface or a belt conveyer, and formed in a rectangular belt shape having a larger length than the folded belt 91 so as to house the folded belt 91. A plurality of reinforcing frames 516 connecting the lower frame 511 increase the strength of the lower frame 511.

The pillar frame 512 is coupled to the top surface of the lower frame 511 and protrudes upward. The pillar frame 512 includes a plurality of pillar frames separated from each other, and has a tube shape.

The insertion frame 513 is inserted into each of the pillar frames 512, and the upper frame 514 is coupled to the top of the insertion frame 513. The frame adjusting body 515 includes a plurality of frame adjusting bodies mounted on the lower frame 511, and the top of the frame adjusting body 515 is coupled to the upper frame 514. When the length of the frame adjusting body 515 is varied, the height of the upper frame 514 coupled to the frame adjusting body 515 is adjusted. At least a second loading from portion 51 is disposed along frame 511, spaced from the first loading platform portions.

The loading guide portion 52 adjusts the drop zone of the belt 91, and induces the belt 91 to be folded and loaded. The loading guide portion 52 is reciprocated along the loading frame portion 51. In the present embodiment, the loading guide portion 52 includes a loading rotating body 521, a loading chain 522, a loading motor 523, a guide bar 524, a guide roller 525, and a guide protrusion 526.

The loading rotating body 521 is rotatably mounted on the outside of the upper frames 514 facing each other. The loading rotating body 521 includes a pair of rotating bodies separated from each other, and a transport hole 518 formed in the upper frame 514 is positioned between the pair of loading rotating bodies 521. The loading chain 522 is wound on the pair of loading rotating bodies 521 and moved along an endless track, and the loading motor 523 is connected to any one of the loading rotating bodies 521 and rotates the loading rotating body 521. The loading motor 523 is fixed to the upper frame 514. The guide bar 524 is arranged between the upper frames 514 facing each other. The guide bar 524 includes a pair of guide bars separated from each other while facing each other, and both ends of the guide roller 525 are rotatably mounted on the guide bar 524. At this time, the pair of guide rollers 525 are arranged in the longitudinal direction of the guide bar 524 so as to be separated from each other, and the belt 91 is passed between the guide rollers 55. The guide protrusion 526 is coupled to the guide bar 524 so as to protrude to the outside. The guide protrusion 526 is coupled to the loading chain 522 through the transport hole 518. Thus, when the loading motor 523 is rotated, the loading rotating body 521 is rotated to move the loading chain 522, and the guide protrusion 526 connected to the loading chain 522 is moved along the transport hole 518. When the guide protrusion 526 is moved, the guide rollers 525 connected to the guide protrusion 526 are moved along the longitudinal direction of the upper frame 514. As the guide rollers 525 are reciprocated, the belt 91 is folded and loaded.

The operation and effect of the belt replacement device in accordance with the embodiment of the present invention will be described as follows.

When the roll bar 92 passing through the central part of the belt 91 wound in a roll shape is placed on the support frame portion 12 of the base portion 10, the first and second rotating roller portions 21 and 22 support the bottom surface of the belt 91 wound in a roll shape.

In the above-described state, the rotation power unit 23 is driven for a predetermined time so as to rotate the first rotating roller portion 21, and an operator inserts the belt 91 between the lower transporting roller 31 and the upper transporting roller 33 of the transporting portion 30.

When the belt 91 is inserted between the lower transporting roller 31 and the upper transporting roller 33, the operator rotates the reduction handle 325 and moves the reduction support 321 downward.

When the reduction support 321 is moved downward, the upper transporting roller 33 is moved downward, and the belt 91 comes in contact with the lower transporting roller 31 and the upper transporting roller 33.

When the belt 91 comes in contact with the lower transporting roller 31 and the upper transporting roller 33, the rotation power unit 23 and the transport power unit 34 are driven to pass the belt 91 through the guide portion 40.

At this time, the guide support 43 adjusts the level of the guide frame 41, and the guide roller 42 mounted on the guide frame 41 is rotated while coming in contact with the belt 91, and guides the belt 91.

The belt 91 is dropped from the end of the guide portion 40 and passed between the guide rollers 525, and the loading guide portion 52 adjusts the drop zone of the belt 91 such that the belt 91 is folded in the loading frame portion 51.

That is, when the loading motor 523 is driven to reciprocate, as shown in FIGS. 8*a*-8*d*, the loading chain 522, the guide rollers 525 maintaining the connection with the loading chain 522 adjust the drop zone of the belt 91 while reciprocated along the longitudinal direction of the loading frame portion 51. As the guide rollers 525 are reciprocated, the belt 91 is folded in the loading frame portion 51.

When the height of the folded belt 91 increases to correspond to the height of the upper frame 514, the frame adjusting body 515 is driven to control the belt 91 so as not to deviate from the loading portion 50. That is, when the length of the frame adjusting body 515 is changed, the level of the upper frame 514 is adjusted. Then, the upper frame 514 is positioned at a higher level than the folded belt 91.

When the belt 91 having a desired length is loaded in the loading portion 50, the rotation power unit 23, the transport power unit 34, and the loading motor 523 are stopped, the belt 91 is cut, and the folded belt 91 is used to replace a belt conveyer.

Although some embodiments have been provided to illustrate the invention in conjunction with the drawings, it will be apparent to those skilled in the art that the embodiments are given by way of illustration only, and that various modifications and equivalent embodiments can be made without departing from the spirit and scope of the invention. The scope of the invention should be limited only by the accompanying claims.

The invention claimed is:

1. A belt replacement device comprising:
   a base portion for receiving a belt placed thereon, the belt being wound in a roll shape;
   a rotating portion mounted on the base portion for rotating the belt wound in a roll shape, the rotating portion causes the belt to unwind from the roll by rotating the belt wound in a roll shape;
   a transporting portion for receiving unwound belt and for advancing the unwound belt to a guiding portion and subsequently to a loading portion; and wherein the guide portion guides the belt discharged through the transporting portion to the loading portion; and
   the loading portion drops and loads the unwound belt received from the guide portion.

2. The belt replacement device of claim 1, wherein the base portion comprises:
   a fixed frame portion installed on a fixed body; and
   a support frame portion coupled to the fixed frame, and supporting a roll bar passing through the center of the belt wound in a roll shape.

3. The belt replacement device of claim 2, wherein the support frame portion comprises:
   a support coupled to the fixed frame portion; and
   a stand mounted on the support so as to place the roll bar thereon, and adjusting the distance between the roll bar and the rotating portion such that the outer circumference of the belt wound in a roll shape comes in contact with the rotating portion.

4. The belt replacement device of claim 3, wherein the stand is mounted on the support so as to be lifted and lowered, and adjusts the level of the roll bar.

5. The belt replacement device of claim 1, wherein the rotating portion comprises:
   a first rotating roller portion rotatably mounted on the base portion and coming in contact with the belt wound in a roll shape;
   a second rotating roller portion rotatably mounted on the base portion, coming in contact with the belt wound in a roll shape, and separated from the first rotating roller portion; and
   a rotation power unit connected to the first rotating roller portion and providing a rotational force to the first rotating roller portion.

6. The belt replacement device of claim 5, wherein the rotating portion further comprises a rotation transmission portion connected to the first and second rotating roller portions, and transmitting the rotational force of the first rotating roller portion to the second rotating roller portion.

7. The belt replacement device of claim 1, wherein the transporting portion comprises:
   a lower transporting roller rotatably mounted on the base portion;
   a reduction adjusting portion mounted on the base portion and moved in the vertical direction;
   an upper transporting roller rotatably mounted on the reduction adjusting portion, and arranged above the lower transporting roller, wherein the reduction adjusting portion is vertically moved to adjust the distance between the lower transporting roller and the upper transporting roller; and
   a transport power unit connected to the lower transporting roller and providing a rotational force to the lower transporting roller.

8. The belt replacement device of claim 1, wherein the guide portion comprises:
   a guide frame arranged at the rear of the transporting portion;
   a guide roller rotatably mounted on the guide frame, and coming in contact with the belt discharged from the transporting portion; and
   a guide support supporting the guide frame.

9. The belt replacement device of claim 8, wherein the guide support has a length that is varied to adjust the level of the guide frame.

10. The belt replacement device of claim 1, wherein the loading portion comprises:
    a loading frame portion forming a space in which the belt dropped from the guide portion is loaded; and
    a loading guide portion moved along the loading frame, and adjusting a drop zone of the belt so as to induce the belt to be folded and loaded.

11. The belt replacement device of claim 10, wherein the level of the loading guide portion is adjusted to correspond to the loading height of the belt.

12. The belt replacement device of claim 10, wherein the loading guide portion comprises a pair of guide rollers between which the belt is passed, and
    the pair of guide rollers adjust the drop zone of the belt while moved along the loading frame.

* * * * *